United States Patent
Azam et al.

(10) Patent No.: US 8,312,493 B2
(45) Date of Patent: Nov. 13, 2012

(54) PROVIDING PROGRAM RESTART FUNCTIONALITY IN A DIGITAL VIDEO NETWORK

(75) Inventors: Khalid Mohammed Azam, Fremont, CA (US); Andrew Palfreyman, San Jose, CA (US); John Pickens, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 531 days.

(21) Appl. No.: 12/141,362

(22) Filed: Jun. 18, 2008

(65) Prior Publication Data
US 2009/0320084 A1 Dec. 24, 2009

(51) Int. Cl.
*H04N 7/173* (2006.01)
*H04N 7/10* (2006.01)
*H04N 7/025* (2006.01)

(52) U.S. Cl. ............ 725/97; 725/34; 725/86; 725/90; 725/93; 725/94

(58) Field of Classification Search .......... 725/32, 725/34, 46, 86, 90, 93–95, 97, 101, 114, 725/118, 131
See application file for complete search history.

(56) References Cited

U.S. PATENT DOCUMENTS

| | | | |
|---|---|---|---|
| 5,815,662 A * | 9/1998 | Ong | 725/92 |
| 6,201,536 B1 * | 3/2001 | Hendricks et al. | 715/716 |
| 6,259,740 B1 * | 7/2001 | Lyu | 375/240.25 |
| 6,543,053 B1 * | 4/2003 | Li et al. | 725/88 |
| 6,973,667 B2 * | 12/2005 | Fritsch | 725/88 |
| 7,107,606 B2 * | 9/2006 | Lee | 725/87 |
| 7,343,614 B1 * | 3/2008 | Hendricks et al. | 725/8 |
| 7,614,070 B2 * | 11/2009 | Urdang et al. | 725/90 |
| 7,636,928 B2 * | 12/2009 | Uno | 725/42 |
| 7,650,617 B2 * | 1/2010 | Hoshino et al. | 725/34 |
| 7,788,393 B2 * | 8/2010 | Pickens et al. | 709/231 |
| 7,890,988 B2 * | 2/2011 | Urdang et al. | 725/116 |
| 7,941,823 B2 * | 5/2011 | Hasek | 725/88 |
| 2002/0114331 A1 * | 8/2002 | Cheung et al. | 370/390 |
| 2003/0149738 A1 * | 8/2003 | Jacobs et al. | 709/217 |
| 2003/0200548 A1 * | 10/2003 | Baran et al. | 725/90 |
| 2003/0226150 A1 * | 12/2003 | Berberet et al. | 725/94 |
| 2004/0031047 A1 * | 2/2004 | Legallais et al. | 725/25 |
| 2004/0163101 A1 * | 8/2004 | Swix et al. | 725/9 |
| 2005/0034171 A1 * | 2/2005 | Benya | 725/143 |

(Continued)

FOREIGN PATENT DOCUMENTS
WO 0249359 A1 6/2002

*Primary Examiner* — Pinkal R Chokshi
(74) *Attorney, Agent, or Firm* — Merchant & Gould (57) ABSTRACT

A technique for providing program restart functionality in a digital video network involves receiving requests from different end-user devices to restart a program and servicing the program restart requests from the different end-user devices via a single broadcast stream. In an embodiment, program restart requests that are received within an established time interval, referred to as an aggregation interval, are serviced by the same broadcast stream. Additionally, during the aggregation interval and before the program restart begins, personalized content can be provided to the end-user devices via, for example, unicasting. Once the aggregation interval is over, all of the unicast streams are switched over to the same broadcast stream and the program broadcast is restarted. In an embodiment, a switch buffer is provided just before the restarted broadcast stream in order to ensure a smooth transition from each of the multiple unicast streams to the restarted broadcast stream.

17 Claims, 8 Drawing Sheets

U.S. PATENT DOCUMENTS

| | | |
|---|---|---|
| 2005/0160465 A1* | 7/2005 | Walker .............................. 725/86 |
| 2005/0166224 A1* | 7/2005 | Ficco ............................... 725/35 |
| 2007/0094689 A1* | 4/2007 | McElhatten et al. ............ 725/58 |
| 2007/0177632 A1* | 8/2007 | Oz et al. ......................... 370/486 |
| 2008/0022347 A1 | 1/2008 | Cohen |
| 2008/0127253 A1* | 5/2008 | Zhang et al. ..................... 725/35 |
| 2009/0063681 A1* | 3/2009 | Ramakrishnan et al. ...... 709/225 |
| 2009/0307719 A1* | 12/2009 | Clark et al. ...................... 725/32 |

* cited by examiner

PROVIDING PROGRAM RESTART FUNCTIONALITY IN A DIGITAL VIDEO NETWORK

TECHNICAL FIELD

The present disclosure relates generally to digital video networks, and more particularly, to techniques for providing program restart functionality in a digital video network that is capable of distributing digital video content via broadcasting and unicasting.

BACKGROUND

Digital video content can now be streamed to multiple clients in real-time over traditional cable television and telephone networks, both of which are being leveraged by service providers to provide more attractive and varied services to customers. The streaming of digital video content to clients is supported by a stream server. A stream server delivers digital video content to end-user devices via multicasting or unicasting, where multicasting is used to distribute the same content to multiple end-user devices such as set top boxes (STBs) concurrently and unicasting is used to provide specific content to a particular end-user device. The end-user devices receive streams of digital video content via multicasting or unicasting and playout the digital video content to a device such as a television.

One feature supported by digital video networks is a program restart feature in which an end-user can request a program that is currently being broadcast to be restarted from the beginning. This feature allows an end-user to watch the program from the beginning even if the end-user's STB was not tuned to the program at the beginning of the program broadcast.

Conventional program restart or "start over" functionality is implemented by establishing a new unicast stream for each end-user device that makes a program restart request. Although establishing a new unicast stream for each new program restart request enables a service provider to implement program restart functionality, the bandwidth requirements for this approach increase linearly with the number of program restart requests and large numbers of program restart requests translate to a large bandwidth requirement.

SUMMARY

A technique for providing program restart functionality in a digital video network involves receiving requests from different end-user devices to restart a program and servicing the program restart requests from the different end-user devices via a single broadcast stream. In an embodiment, program restart requests that are received within an established time interval, referred to as an aggregation interval, are serviced by the same broadcast stream. Additionally, during the aggregation interval and before the program restart begins, personalized content can be provided to the end-user devices via, for example, unicasting. The personalized content may include personalized advertisements that are selected to fit into the aggregation interval. Once the aggregation interval is over, all of the unicast streams are switched over to the same broadcast stream and the program broadcast is restarted. In an embodiment, a switch buffer is provided just before the restarted broadcast stream in order to ensure a smooth transition from each of the multiple unicast streams to the restarted broadcast stream. For example, content with a higher density of I-frames than standard MPEG encoded video is provided as the switch buffer. The process of servicing multiple program restart requests using a single broadcast stream can be repeated as additional program restart requests are received.

Because multiple different program restart requests are serviced with a single broadcast stream, multiple program restart requests can be supported without establishing a new unicast stream for each different program restart request. Additionally, the aggregation interval allows for opportunities to provide personalized advertising to end-user devices. Further, the program restart functionality can be supported by the current installed base of STBs.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DESCRIPTION OF EXAMPLE EMBODIMENTS

Figure 1:
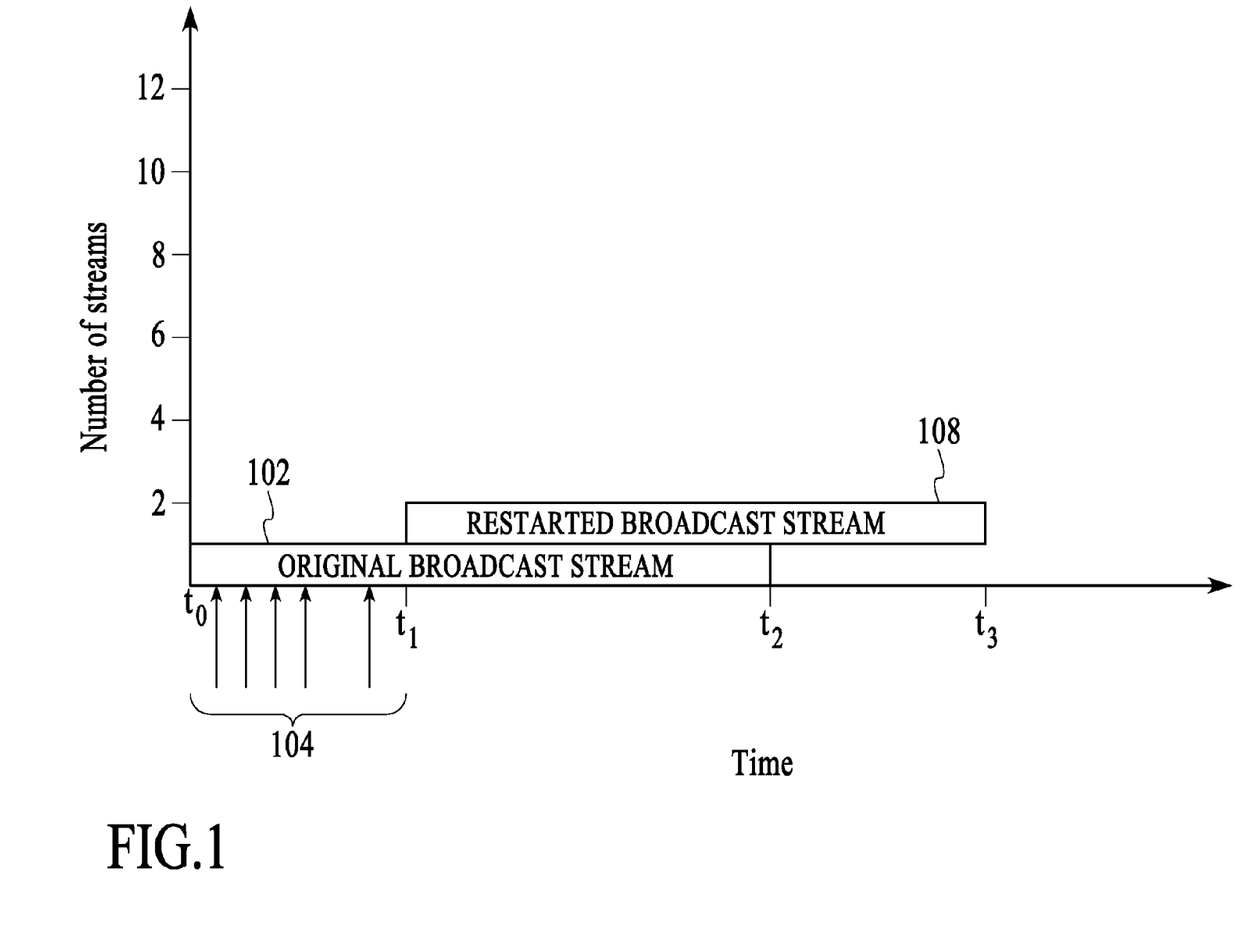
FIG. 1 is a graph of digital video streams versus time that illustrates the aggregation of program restart requests from multiple different end-user devices.

FIG. 1 is a graph of digital video streams versus time that illustrates the aggregation of program restart requests from multiple different end-user devices. In FIG. 1, an original broadcast stream 102 begins at time $t_0$ and runs until time $t_2$. During an aggregation interval 104, program restart requests 106 are received from multiple different end-user devices. All of the program restart requests that are received within the aggregation interval are eventually serviced by the same broadcast stream. In particular, a new broadcast stream 108, referred to herein as the "restarted broadcast stream" is established to broadcast the same program as the original broadcast stream from the beginning of the program. The restarted broadcast stream is broadcasted to all of the end-user devices from which program restart requests were received during the aggregation interval. All of the end-user devices that are serviced by the same restarted broadcast stream are said to be in the same aggregation group.

Details of the aggregation interval 104, including for example, the start time and the duration, are implementation specific. The start of the aggregation interval can be triggered, for example, by the receipt of a program restart request 106, by a periodic time interval, or by a volume threshold of program restart requests. The duration of the aggregation interval can be fixed or dynamic and can be adjusted to take into account, for example, bandwidth consumption, advertising revenue, and/or end-user experience.

In an embodiment, the aggregation interval 104 starts upon receipt of the first program restart request 106 and continues for a fixed time interval, e.g., two minutes. At the end of the aggregation interval, all of the end-user devices in the aggregation group begin receiving the restarted broadcast stream 108 at time $t_1$, which provides the program to the end-user devices from the beginning. The restarted broadcast stream continues until the program ends at time t3. As illustrated in FIG. 1, multiple program restart requests are supported with the addition of a single restarted broadcast stream.

Different techniques can be used to provide the restarted broadcast stream 108 to the appropriate end-user devices. In one embodiment, the restarted broadcast stream is multicast to the end-user devices without any special tuning by the end-user devices. In another embodiment, the end-user devices are tuned to a channel that is designated for providing the restarted broadcast stream. Regardless of the technique that is used, the restarted broadcast stream is provided to all of the end-user devices within the aggregation group. As used herein, the terms broadcast and broadcasting refer generally to any delivery techniques that distribute the same content to multiple different end-user devices concurrently. Therefore, broadcasting may include broadcasting as is traditionally known in cable and satellite television networks, switched digital video multicasting as in cable and packet switched networks, or multicasting as is known in packet-switched networks, e.g., IP networks.

Figure 2:
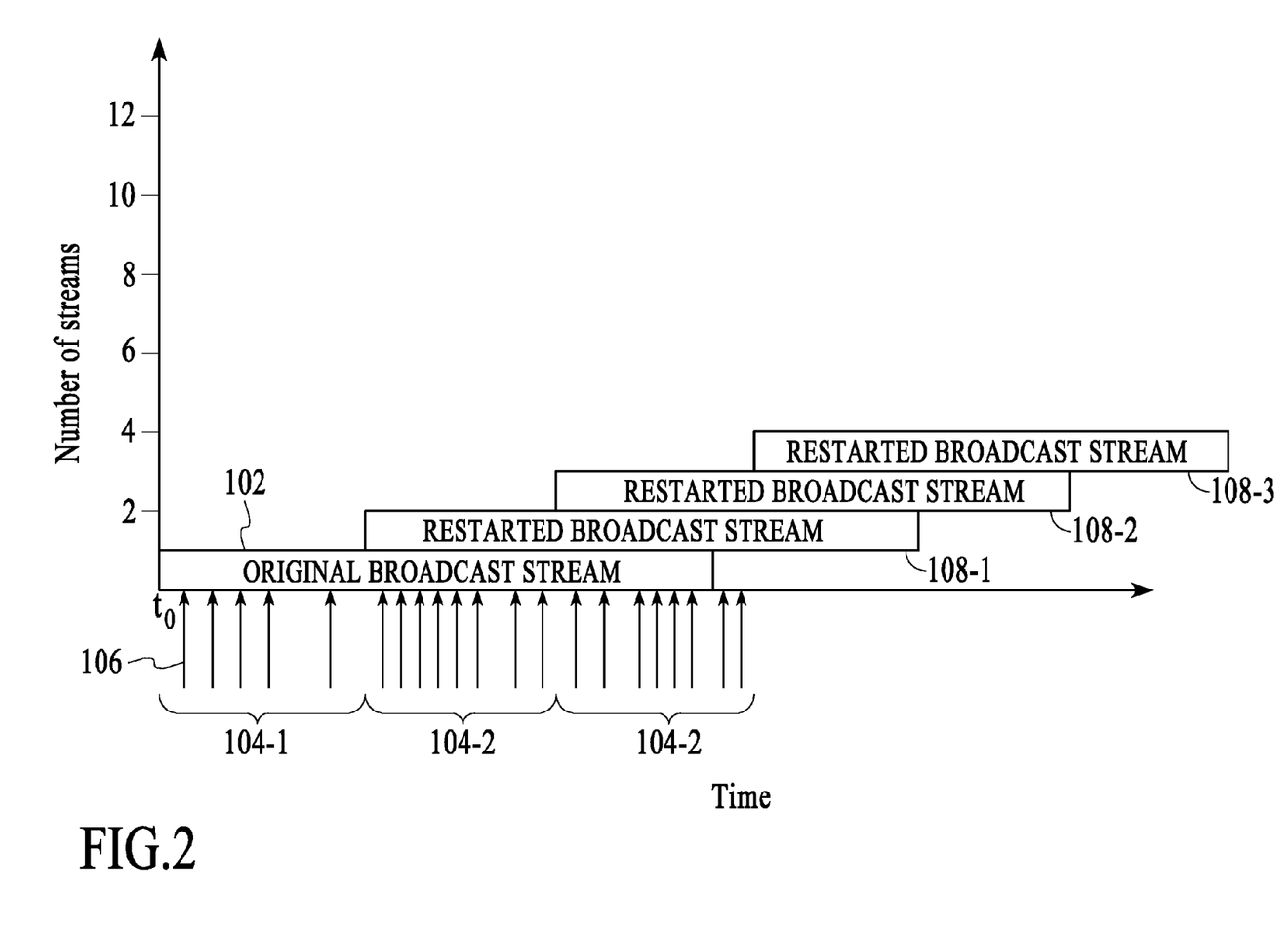
FIG. 2 is a graph of digital video streams versus time that illustrates the aggregation of program restart requests into three different aggregation groups that are serviced by three different restarted broadcast streams.

Although FIG. 1 illustrates only one aggregation interval 104 and only one restarted broadcast stream 108, the aggregation of program restart requests into a restarted broadcast stream can be repeated as additional program restart requests are received. FIG. 2 is a graph of digital video streams versus time that illustrates the aggregation of program restart requests 106 into three different aggregation groups that are serviced by three different restarted broadcast streams 108-1, 108-2, and 108-3. In the example of FIG. 2, all of the program restart requests received in aggregation interval 104-1 are serviced by restarted broadcast stream 108-1, all of the program restart requests received in aggregation interval 104-2 are serviced by restarted broadcast stream 108-2, and all of the program restart requests received in aggregation interval 104-3 are serviced by restarted broadcast stream 108-3. Using multiple different aggregation groups, each with a short aggregation interval, multiple program restart requests can be serviced without subjecting the end-users to long delays before the desired program is presented.

In the example of FIG. 2, the aggregation intervals 104-1, 104-2, and 104-3 are serial with respect to time. In alternative embodiments, the aggregation intervals may be overlapping in time. In an embodiment, program restart requests may be added to an aggregation group based on characteristics other than the time of the program restart request. For example, program restart requests may be added to an aggregation group based on location criteria, resource availability criteria, content criteria, and/or service level criteria. In an embodiment, aggregation groups may be sequentially placed, run parallel with other aggregation groups or may overlap with each other. Aggregation groups may be based on criteria such as fixed intervals, dynamically configured intervals to reduce network bandwidth utilization, or aggregation groups of targeted audience profiles.

Figure 3:
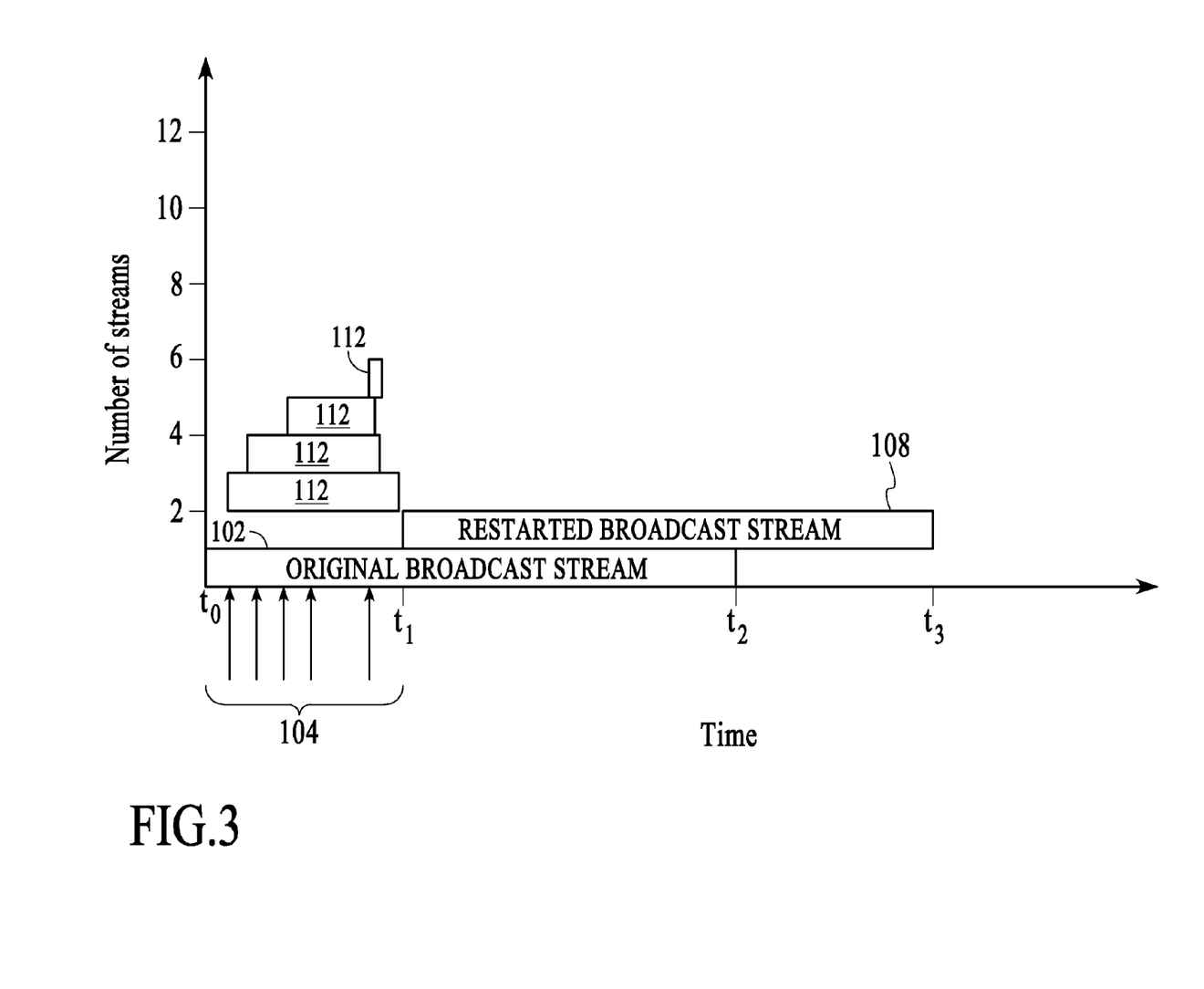
FIG. 3 illustrates multiple different unicast streams that are provided to the end-users devices in an aggregation group in response to each program restart request.

In an embodiment, during an aggregation interval 104 and before the restarted broadcast stream 108 begins, personalized content is provided to the end-user devices in the aggregation group. For example, each end-user device is provided personalized content via unicasting. FIG. 3 illustrates multiple different unicast streams 112 that are provided to the end-users devices in an aggregation group in response to each program restart request 106. As illustrated in FIG. 3, the unicast streams are provided after the respective program restart requests and continue until just before the restarted broadcast stream begins. In an embodiment, the unicast streams provide personalized content, such as personalized advertisements, to each different end-user device. In an embodiment, the personalized content is selected to fit into the time that remains in the aggregation interval between the time that the program restart request is received and the time that switch over to the broadcast stream begins. The personalized content may include a series of personalized messages such as short advertisements or one long piece of content.

As illustrated in FIG. 3, end-users whose program restart requests 106 fall near the beginning of the aggregation interval 106 receive more personalized content than the end-users whose program restart requests fall near the end of the aggregation interval. Wherever the program restart requests fall within the aggregation interval, the content received by the end-user devices can be personalized to the end-user. Various techniques for selecting the personalized content can be used. Although personalized content can be provided to the end-user devices during the aggregation interval, this is not a requirement. For example, all of the end-user devices in the aggregation group can be provided the same content during the aggregation interval. The same content could be provided via broadcasting, unicasting, or a combination thereof.

Figure 4:
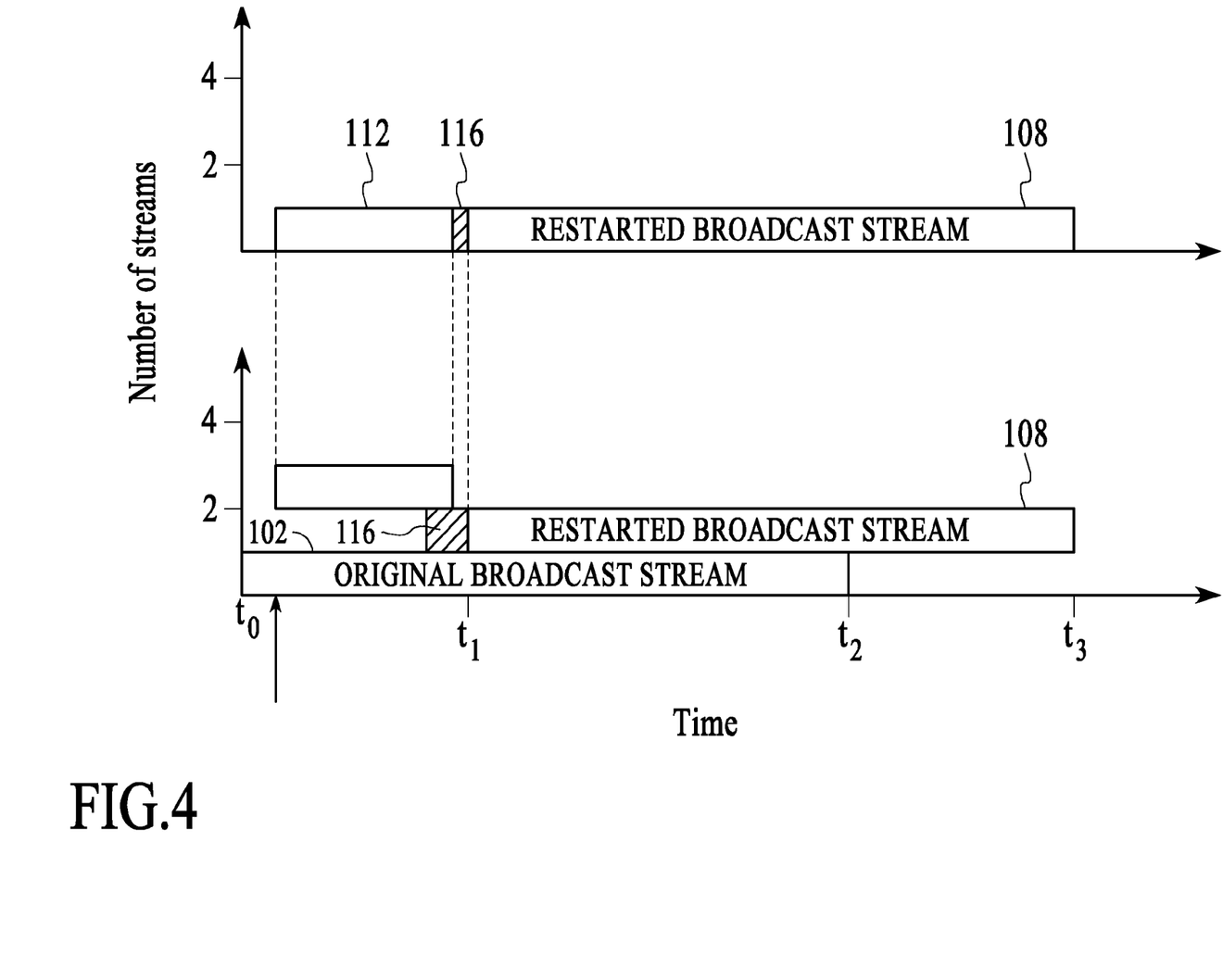
FIG. 4 is a graph of digital video streams versus time that illustrates a switch buffer located just before a restarted broadcast stream.

In an embodiment, a switch buffer is used to provide a smooth transition from the unicast streams 112, which are provided during the aggregation intervals 104, to the restarted broadcast streams 108. FIG. 4 is a graph of digital video streams versus time that illustrates a switch buffer 116 prefixed at the beginning of a restarted broadcast stream. In an embodiment, the switch buffer is a stream of digital video content with a high concentration of I-frames and all of the unicast streams (only one shown) are automatically switched over to the channel that carries the restarted broadcast stream during the time that the switch buffer is active. Because the switch buffer has a high concentration of I-frames, the switch from the unicast stream to the restarted broadcast stream appears to occur quickly and without a service disruption to the end-user. In an embodiment, the switch buffer is a stream of I-frames that includes program information (e.g., text and/or graphics) related to the program that is to be restarted. In another embodiment, the switch buffer is created at the end-user devices in response to instructions from a stream server. For example, the end-user devices may be instructed to produce a certain picture until the restarted broadcast stream is received. In other embodiments, the switch buffer can be populated with other types of video content.

The length of the switch buffer 116 is implementation specific. In an embodiment, the switch buffer is at least as long as the shortest interval of personalized content so that the time before the restarted broadcast stream commences can be completely filled with either personalized content or the switch buffer.

FIG. 4 also illustrates a view, from the perspective of an end-user device, of the digital video stream that results from the above-described program restart operation. As illustrated in FIG. 4, the end-user device first sees the unicast stream 112 of personalized content, then a short portion of the switch buffer 116, and then the restarted broadcast stream 108. Although the switch buffer is active during a portion of the time that the unicast stream is active, the end-user device only receives the switch buffer for a short period of time after the unicast stream ends and before the broadcast stream of the program begins.

If there is not enough time for personalized content to be provided to the end-user before the restarted broadcast stream 108 begins, an end-user could be switched directly to the switch buffer 116. This would prevent the end-user from receiving personalized content but would provide the end-user with the restarted broadcast stream in the most expeditious manner. Alternatively, the end-user could be bumped into the next aggregation interval and provided with personalized content during the next aggregation interval.

Figure 5:
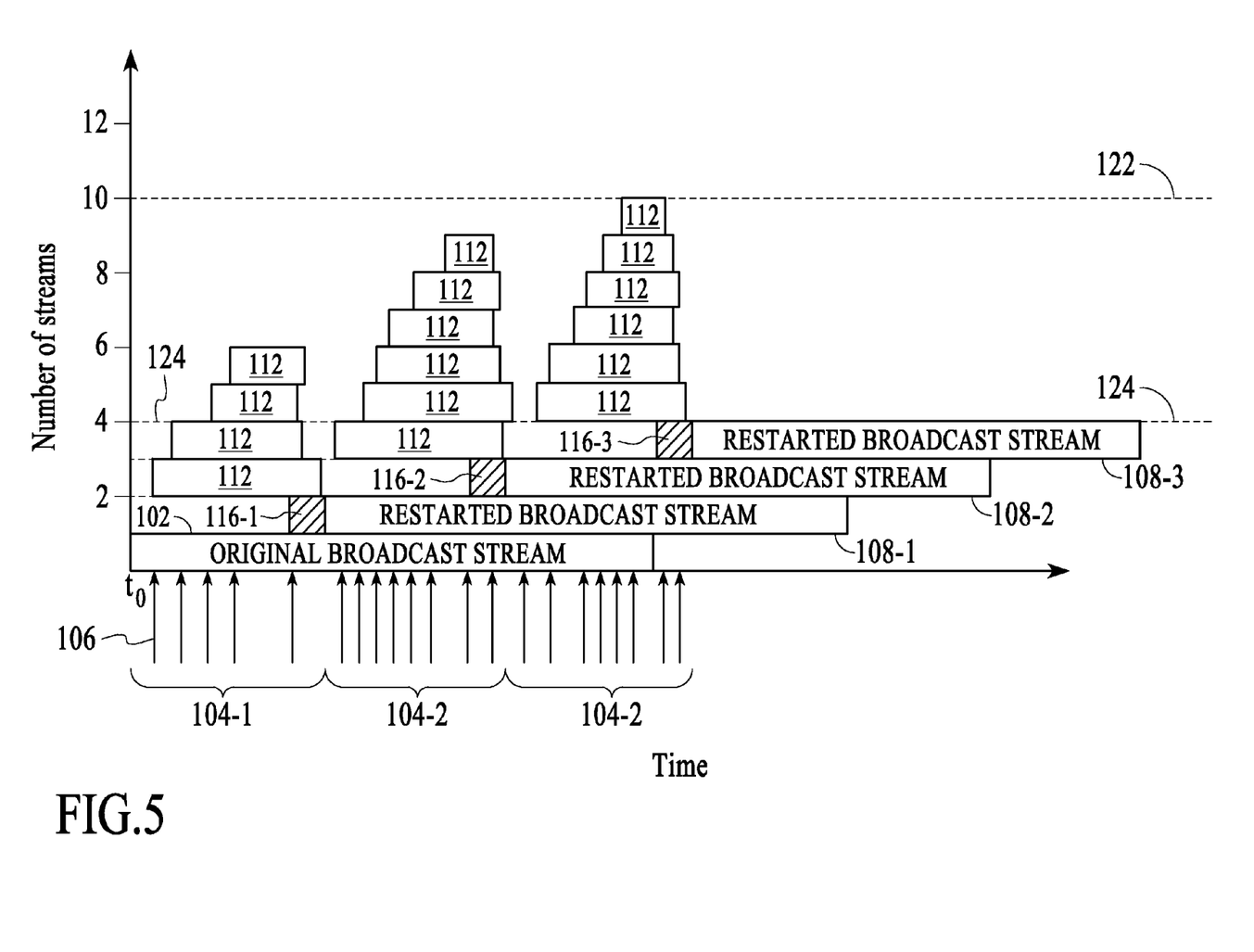
FIG. 5 is a graph of digital video streams versus time that illustrates the combination of three different aggregation intervals, three different restarted broadcast streams, unicast streams of personalized content for the program restart requests, and a switch buffer before each of the three different restarted broadcast streams.

FIG. 5 is a graph of digital video streams versus time that illustrates the combination of three different aggregation intervals 104-1, 104-2, and 104-3, three different restarted broadcast streams 108-1, 108-2, and 108-3, unicast streams 112 of personalized content for the program restart requests, and a switch buffer 116-1, 116-2, and 116-3 before each of the three different restarted broadcast streams. In the first aggregation interval, five program restart requests 106 are received, with four of the program restart requests resulting in unicast streams of personalized content and one of the program restart requests resulting in a switch directly to the switch buffer of the restarted broadcast stream. In the second aggregation interval, which is subsequent to the first aggregation interval, eight program restart requests are received, with six of the program restart requests resulting in unicast streams of personalized content and two of the program restart requests resulting in a switch directly to the switch buffer of the restarted broadcast stream. In the third aggregation interval, which is subsequent to the second aggregation interval, eight program restart requests are received, with six of the program restart requests resulting in unicast streams of personalized content and two of the program restart requests resulting in a switch directly to the switch buffer of the broadcast stream.

FIG. 5 also illustrates peak usages that result from implementing program restart functionality according to the above-described techniques. As illustrated in FIG. 5, twenty-one program restart requests are serviced yet the peak usage at any one time is ten streams as indicated by dashed line 122. Ten streams are active at time $t_{peak}$ and the ten active streams include the original broadcast stream 102, the first and second restarted broadcast streams 108-1 and 108-2, the switch buffer 116-3 for the third restarted broadcast stream 108-3, and the six unicast streams 112 that are active during the third aggregation interval 104-3. However, once the third aggregation interval ends and the third broadcast stream begins, the peak usage drops down to the four broadcast streams of the program (as indicated by dashed line 124), the four broadcast streams including the original broadcast stream and the three restarted broadcast streams. The usage illustrated in FIG. 5 continues to drop as broadcast streams end.

Figure 6:
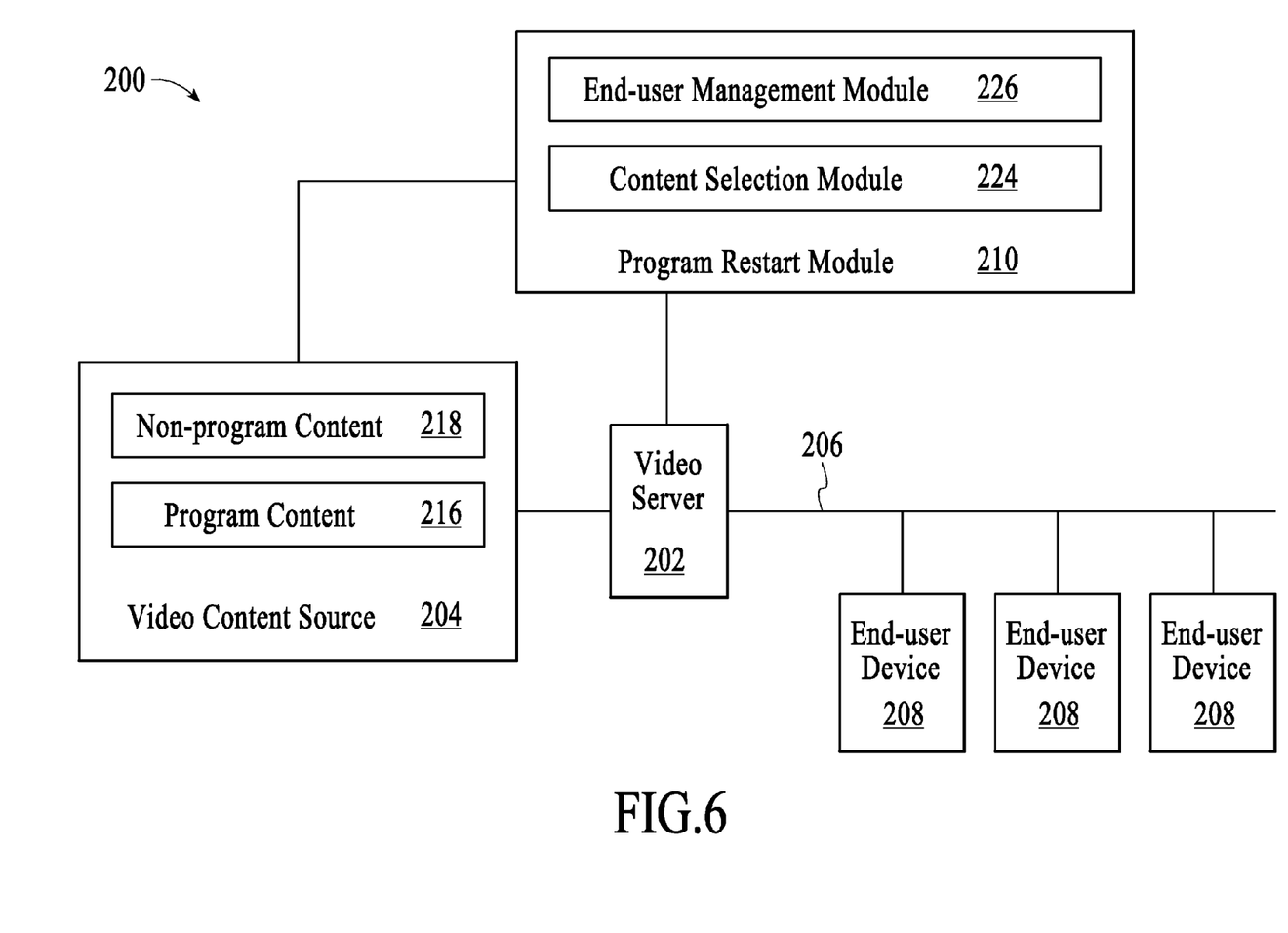
FIG. 6 depicts a digital video network that is capable of distributing digital video content to end-user devices via broadcasting and unicasting.

FIG. 6 depicts a digital video network 200 that is capable of distributing digital video content to end-user devices via broadcasting and unicasting. The digital video network includes a video server 202, a video content source 204, an access network 206, end-user devices 208, and a program restart module 210. The video server 202 is configured to stream digital video content to the end-user devices 208 via broadcasting and unicasting.

The video content source 204 provides digital video content to the video server. In the embodiment of FIG. 6, the video source stores both program content 216 and non-program content 218. For example, the non-program content includes advertising content that can be selected to be personalized to particular end-users. In an embodiment, the video content source provides video streams that are encoded according to an MPEG encoding standard, including, for example, MPEG-1, MPEG-2, and MPEG-4. The video content source may include, for example, encoders that are connected to receive video content and video servers, such as video on demand and advertisement servers that store encoded video content.

The end-user devices 208 depicted in FIG. 6 are configured to receive digital video content from the video server 202. In an embodiment, the end-user devices may include conventional cable STB capabilities and/or IP-based STB capabilities.

The access network 206 between the video server 202 and the end-user devices 208 may be a cable-based access network. Alternatively, other types of access networks may include, for example, digital subscriber line (DSL) networks, passive optical networks (PONs), and wireless access networks may be utilized.

The program restart module 210 manages the program restart functionality and includes, for example, a content selection module 224 and an end-user management module 226. The end-user management module collects and stores information related to the end-users. The information is used by the content selection module to select personalized content for the end-users in response to a program restart request.

In operation, an end-user device 208 produces a program restart request in response to a user input. In an embodiment, the program restart request triggers the following sequence of events. First, the program restart module 210 initiates the set up of a unicast session using, for example, techniques similar to traditional video on demand session set up protocols. Via the unicast session, a play list of personalized content, such as personalized advertisements, is selected by the content selection module. The selected content is then obtained from the video content source and unicast to the end-user device 208. The program restart module also schedules a separate restart broadcast stream with a prefixed switch buffer. Towards the end of the unicast stream session, the video server streams both the unicast stream and the switch buffer that is prefixed to the restarted broadcast stream. In order to switch the end-user device from the unicast stream to the restarted broadcast stream, the end-user device is switched to the channel that is currently streaming the prefixed switch buffer. In an embodiment, switching the end-user device to the channel that is currently streaming the switch buffer involves instructing the end-user device to tune to the channel that includes the switch buffer and ultimately the restarted broadcast stream. The instruction to switch to the channel that carries the restarted multicast stream can be communicated either via and in-band message or an out of band message. Upon receiving the instruction to tune the end-user device to the channel that carries the switch buffer and the restarted broadcast stream, the end-user device is programmed to black out the on screen display and mute the audio until the end-user device receives, decodes, and is ready to present an I-frame from of the switch buffer. Because the switch buffer has a high concentration of I-frames, the switch to the new channel appears to occur quickly and without a service disruption to the end-user.

Once the end-user device 208 is successfully tuned to the channel that carries the restarted broadcast stream, the end-user device sends a request to terminate the unicast session and to release the bandwidth resources. The end-user device also sends a channel change message to the program restart module 210 to indicate that it is now tuned to the broadcast channel streaming the restarted broadcast stream and the program restart module keeps a running count of how many users are tuned to the broadcast channel.

In an embodiment, if an end-user makes a channel change while the unicast stream is active, the unicast stream is terminated and the end-user device 208 is tuned to the desired broadcast stream. A similar operation occurs in traditional video on demand applications when a user switches from a video on demand stream to a broadcast channel.

In an embodiment, if an end-user makes a channel change while the unicast stream is active and then tries to switch back to the restarted broadcast stream, then the end-user device may be configured to tune to the original broadcast stream instead. Once tuned to the original broadcast stream, the end-user may once again make a program restart request and be added to a new aggregation group.

In an embodiment, if an end-user makes a channel change while the restarted broadcast stream is active and then tries to return to the restarted broadcast stream, the system may be configured to tune the end-user device to the restarted broadcast stream it just left or the end-user device may be tuned to the original broadcast stream of the program.

The above-described techniques can be utilized with some trick mode operations, e.g., pause and rewind. In an embodiment in which the end-user device is a digital video recorder (DVR) enabled STB, the end-user will be able to implement pause, rewind, resume, and fast forward trick modes as with any other broadcast. In an embodiment in which the STB does not include any DVR capability, various scenarios occur. In one embodiment, if an end-user initiates a trick mode operation, then a unicast stream is established for the end-user and the end-user exits the aggregation group. In another embodiment, if the end-user initiates a trick mode operation, the end-user can be discretely moved between an active restarted broadcast stream that best fits with the trick mode operation. In another embodiment, rewind functionality can be disabled during the program restart operations.

Optimization of Aggregation Interval

The above-described program restart functionality can be further optimized with respect to the minimization of peak required bandwidth per program restart request given some assumptions about the total number of end-user devices that join the restarted broadcast stream while it is active. Such an analysis results in even better bandwidth savings over the above-described techniques, which utilizes fixed sizes and duration of the personalized unicast stream (e.g. number of personalized advertisements). These savings are to be had by tailoring the number of advertisements per group as an adaptive function of the estimated total number of subscribers.

The following optimization is described for advertisement insertion, though it can be generalized to any type of personalized content. Consider a single restarted broadcast stream of duration T seconds, which will be joined by a total of N subscribers over its duration. Various arrival models can be examined for these N subscribers. A goal is to minimize the peak required bandwidth by manipulating $a_i$, the duration in seconds of personalized end-user advertisements prefixing playback for the first arrival in the group i. Each prefix can be considered as a unicast group i of subscribers that have arrived during the period over which $a_i$ is active. The number of subscribers belonging to each group is denoted $n_i$, where $1<=i<=m$, m being the total number of groups. Thus $$\sum_{i=1}^{m} n_i = N$$

The model dictates that the maximum required bandwidth x (in units of number streams) occurs when all but one of all unicast stream groups have been consolidated, and occurs at the time of the arrival of the Nth (i.e. the final) subscriber. This is the case for any and all arrival scenarios.

A simplifying advantage of this model is that the arrival statistics within each aggregation group are irrelevant to the derivation of the optimal value, $a_0$. Rather, only the total $n_i$ is relevant. This is also the case for any and all arrival scenarios.

Scenario 1: Uniform Arrival Rate

This scenario is the simplest case, whereby all the $a_i=a$ and all the $n_i=n$. Here we have the relations:

$$n = \frac{Na}{T} \text{ subscribers/group}; m = \frac{T}{a} \text{ groups}$$

Thus the maximum required bandwidth is given by $$x = (m-1) + n$$

$$x = (a)\frac{N}{T} + \left(\frac{1}{a}\right)T - 1$$

As a sanity check on this equation:

setting $a=T(m=1)$ yields $x=N+1-1=N$ setting $a=T/N(m=N)$ yields $x=1+N-1=N$ which in both extreme cases describes the default behavior that is to be improved upon. An optimal value $a_0$ is derived to yield:

$$x(a)_{min} \cdot \frac{\partial x}{\partial a} = \frac{N}{T} - \frac{T}{a^2}, = 0 \text{ when}$$

$$a_0 = \frac{T}{\sqrt{N}}, \text{ and}$$

$$\frac{\partial^2 x}{\partial a^2} = +\frac{2T}{a^3} > 0,$$

so $a_0$ represents a minimum for $x(a)$, as required. Thus:

$x(a)_{min}=2\sqrt{N}-1$, which is always <N for N>1, as required.

Figure 7:
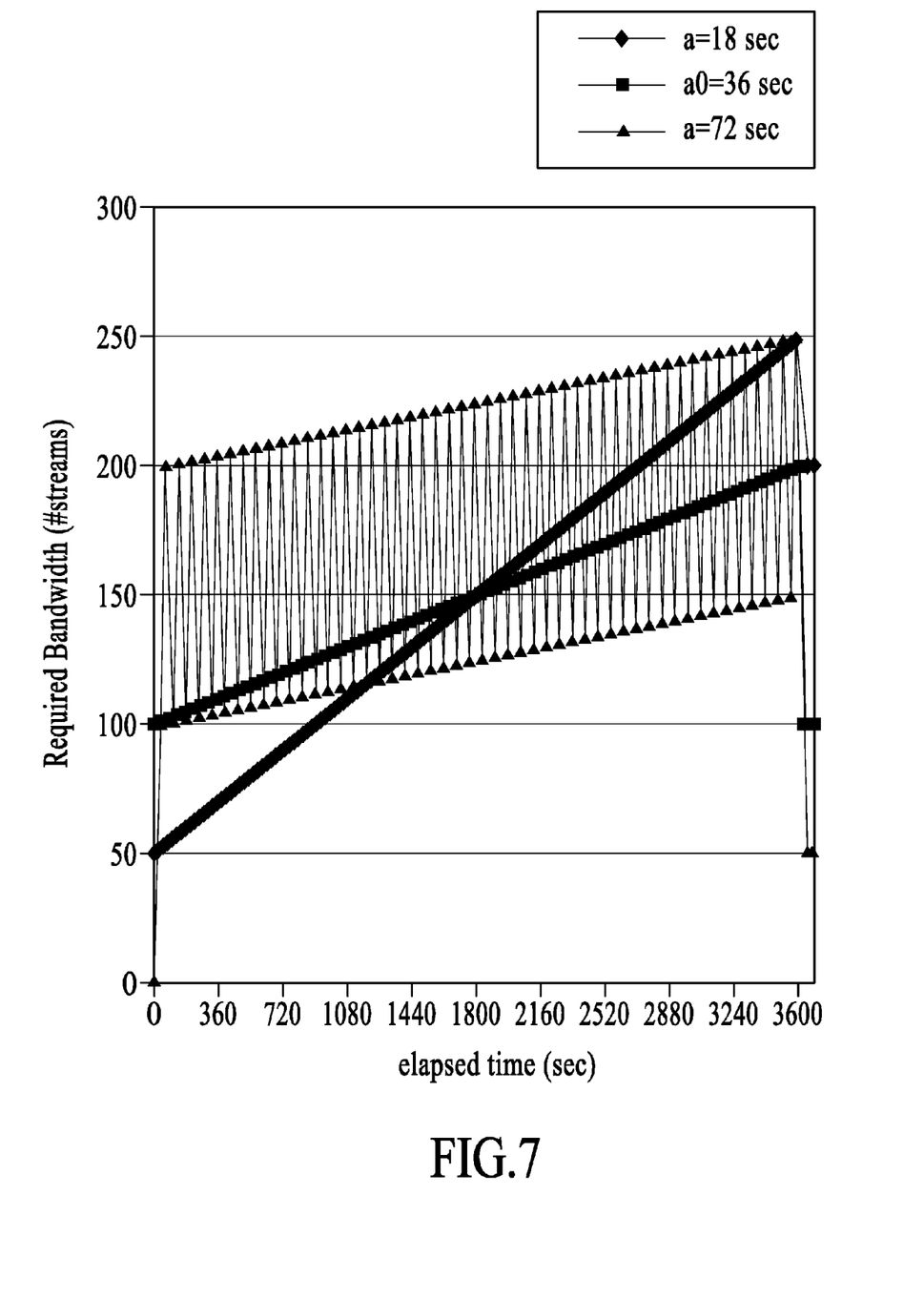
FIG. 7 is a graph of required bandwidth, in terms of number of unique streams, versus time.

The graph of FIG. 7 illustrates three different plots of demanded bandwidth x over the duration T of a content, parameterized with different values of a—below, equal to, and above $a_0$—from which it's clear that $a_0$ represents an optimal value from the point of view of minimizing the peak bandwidth required to be provisioned. The bandwidth reduction factor r is given by:

$$r = \frac{N}{2\sqrt{N}-1} \rightarrow \frac{\sqrt{N}}{2} \text{ for large } N.$$

Thus for 10,000 total subscribers to a given content, we can reduce peak required bandwidth by a factor of 50 by using this model with this scenario. Note however that this scenario assumes that we know N a priori, equal numbers of subscribers arrive in each interval a. However, this is clearly an unrealistic assumption.

Uniform Arrival Rate Scenario

Note that, due to scaling, the a=18 and a0=36 plots of FIG. 7 show only the peak bandwidth values. The a=72 plot shows intermediate values of both peak and consolidated bandwidth. All of the plots of FIG. 7 show the consolidated final value. The "bandwidth to beat" here is that for a conventional system—i.e. 10,000 streams by the end of the show.

Scenario 2: Real Past Arrival Rate/Uniform Future Arrival Rate

This scenario represents a more realistic case, whereby when a prefix bin is filling for an intermediate new stream, the current and future data is treated as per Scenario 1 for a fresh stream with a duration which decreases as time elapses. Additionally, the initial estimate for the total number of subscribers is dynamically updated based on already-received statistics, assuming a uniform average arrival rate throughout the content's lifetime. Thus, due to the dynamic nature of real arrivals, the values of N, $a_i$ and $n_i$ will change adaptively. Since the future is still modeled as a uniform arrival rate, the chosen value of $a_i$ for group i in this scenario uses directly the formulae of scenario 1, whereby the goal as ever is to minimize peak bandwidth utilization.

Scenario 3: Real Past Arrival Rate/Modeled Future Arrival Rate

This scenario represents the most realistic case. It is a modification of Scenario 2, whereby previously-logged arrivals are input into a model of a typical arrival profile over the lifetime of the content, and all future $n_i$'s scaled based on the history and the model.

Figure 8:
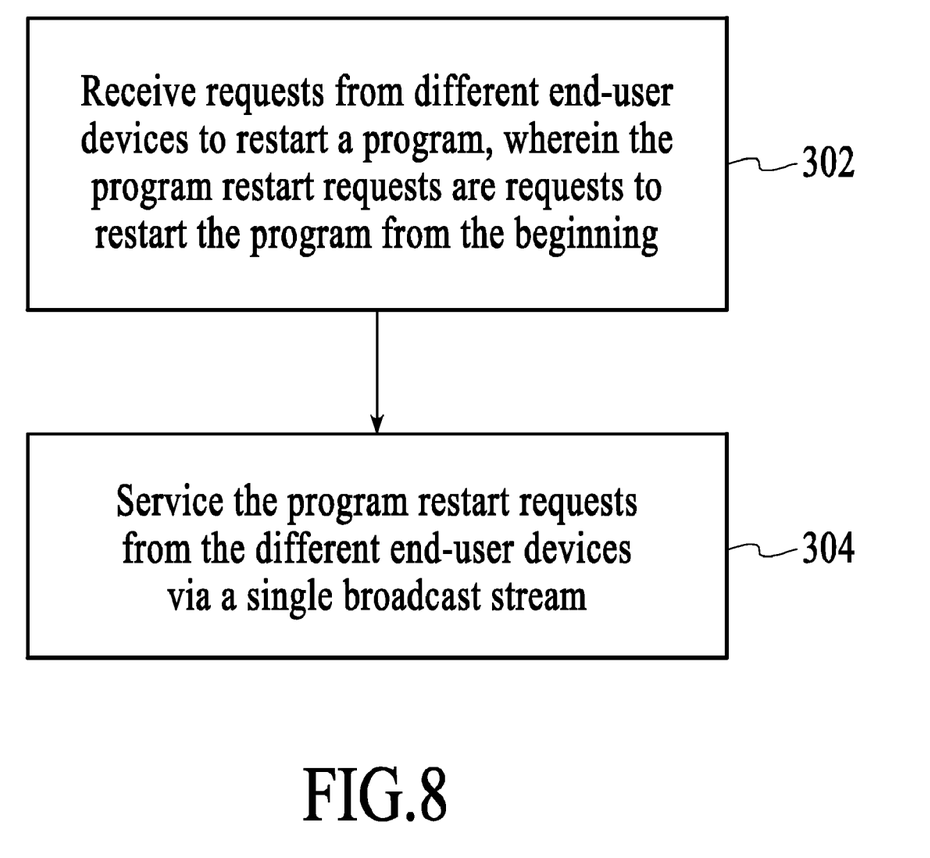
FIG. 8 is a process flow diagram of a method for providing program restart functionality in a digital video network.

FIG. 8 is a process flow diagram of a method for providing program restart functionality in a digital video network. At block 302, requests are received from different end-user devices to restart a program, wherein the program restart requests are requests to restart the program from the beginning. At block 304, the program restart requests are serviced from the different end-user devices via a single broadcast stream.

The above-described techniques can be implemented using the installed base of single tuner legacy digital STBs and PVRs already deployed in cable networks. Further, implementing the above-described techniques would not require changes to STB drivers and can be enabled at the STB application interface level.

Although specific embodiments of the invention have been described and illustrated, the invention is not to be limited to the specific forms or arrangements of parts as described and illustrated herein. The invention is limited only by the claims.

What is claimed is:

1. A method for providing program restart functionality in a digital video network, the method comprising:
   receiving requests from different end-user devices to restart a program, wherein the program restart requests are requests to restart the program from the beginning;
   servicing the program restart requests from the different end-user devices via a single broadcast stream;
   wherein servicing the program restart requests comprises establishing an aggregation interval and servicing restart requests that occur within the aggregation interval via the single broadcast stream, wherein the single broadcast stream begins at the end of the aggregation interval, wherein minimum bandwidth consumption for the aggregation interval is $2\sqrt{N}-1$, wherein N is the total number of program restart requests, wherein the total number of end-user devices in the aggregation interval is estimated based on historical data, wherein the duration of the aggregation interval is calculated as $$a_0 = \frac{T}{\sqrt{N}}$$

wherein $a_0$ is the optimal value, T is duration of the restarted program, and wherein N is the total number of program requests received; and
   providing personalized content to the end-user devices during the aggregation interval via multiple different unicast streams, wherein providing personalized content to the end-user devices via multiple different unicast streams comprises selecting a number of personalized content that fits into a remaining portion of the aggregation interval for each different end-user device before switchover to the single broadcast stream, wherein the number of personalized contents per aggregation interval is selected based on an estimated total number of program restart request received for the program to minimize a peak required bandwidth, wherein the remaining portion of the aggregation interval for each different end-user device is the time that remains in the aggregation interval between the time that the corresponding program restart request is received and the time that the switch over to the single broadcast stream begins; and
   wherein servicing the program restart requests comprises providing a switch buffer before the single broadcast stream, wherein the switch buffer comprises a buffer stream having a higher density of I-frames than the single broadcast stream, wherein the switch buffer and the multiple different unicast streams are streamed simultaneously during a period before the single broadcast stream begins; and
   instructing the end-user devices to tune to a channel that includes the switch buffer in order to switch the unicast streams of the end-user devices to the switch buffer before the single broadcast stream begins.

2. The method of claim 1 wherein the aggregation interval is triggered by at least one of the following: a periodic time interval, a number of program restart requests received, and upon receipt of a program restart request.

3. The method of claim 1 wherein providing the personalized content to the end-user devices comprises selecting the personalized content in response to the aggregation interval.

4. The method of claim 1 wherein servicing the program restart requests comprises providing instructions to the end-user devices to cause the end-user devices to produce a switch buffer.

5. The method of claim 1 wherein servicing the program restart requests comprises combining program restart requests into multiple different aggregation groups and establishing a different restarted broadcast stream for each different aggregation group.

6. A system for providing program restart functionality in a digital video network, the system comprising:
   a video server configured to provide broadcast and unicast streams of digital video content to end-user devices in the digital video network;
   a program restart software module configured to:
      receive requests from different end-user devices to restart a program, wherein the program restart request is a request to restart the program from the beginning;

instruct the video server to service the program restart requests from the different end-user devices via a single broadcast stream on a channel;

establish an aggregation interval and service restart requests that occur within the aggregation interval via the single broadcast stream, wherein minimum bandwidth consumption for the aggregation interval is 2 $\sqrt{N}-1$, wherein N is the total number of program restart requests, wherein the total number of end-user devices in the aggregation interval is estimated based on historical data, wherein the duration of the aggregation interval is calculated as $$a_0 = \frac{T}{\sqrt{N}}$$

wherein $a_0$ is the optimal value, T is duration of the restarted program, and wherein N is the total number of program requests received, wherein the single broadcast stream begins at the end of the aggregation interval;

initiate providing personalized content to the end-user devices via multiple different unicast streams during the aggregation interval; and select a number of personalized content that fits into a remaining portion of the aggregation interval for each different end-user device before switchover to the single broadcast stream, wherein the number of personalized contents per aggregation interval is selected based on an estimated total number of program restart request received for the program to minimize a peak required bandwidth, and wherein the remaining portion of the aggregation interval for each different end-user device is the time that remains in the aggregation interval between the time that the corresponding program restart request is received and the time that the switch over to the single broadcast stream begins;

provide a switch buffer before the single broadcast stream, wherein the switch buffer comprises a buffer stream having a higher density of I-frames than the single broadcast stream, wherein the switch buffer and the multiple different unicast streams are streamed simultaneously from the video server during a period before the single broadcast stream begins; and instruct the end-user devices to tune to a channel that includes the switch buffer in order to switch the unicast streams of the end-user evices to the switch buffer before the single broadcast stream begins.

7. The system of claim 6 wherein the aggregation interval is triggered by at least one of the following: a periodic time interval, a number of program restart requests received, and upon receipt of a program restart request.

8. A method for providing program restart functionality in a digital video network, the method comprising:

receiving requests from different end-user devices to restart a program, wherein the program restart requests are requests to restart the program from the beginning;

establish an aggregation interval, wherein minimum bandwidth consumption for the aggregation interval is 2 $\sqrt{N}-1$, wherein N is the total number of program restart requests, wherein the total number of end-user devices in the aggregation interval is estimated based on historical data, wherein the duration of the aggregation interval is calculated as $$a_0 = \frac{T}{\sqrt{N}}$$

wherein $a_0$ is the optimal value, T is duration of the restarted program, and wherein N is the total number of program requests received, servicing program restart requests that are received during the aggregation interval via a single broadcast stream, wherein the single broadcast stream begins at the end of the aggregation interval;

wherein servicing the program restart requests comprises:

during the aggregation interval, unicasting a number of personalized content to the end-user devices from which program restart requests are received, wherein the personalized content is unicast in multiple different unicast streams wherein the number of personalized contents per aggregation interval is selected based on an estimated total number of program restart request received for the program to minimize a peak required bandwidth;

providing a switch buffer before the single broadcast stream and switching the end-user devices from the unicast personalized content to the switch buffer before the single broadcast stream begins, wherein the switch buffer comprises a buffer stream having a higher density of I-frames than the single broadcast stream and wherein the switch buffer and the multiple different unicast streams are streamed simultaneously during a period before the single broadcast stream begins; and instructing the end-user devices to tune to a channel that includes the switch buffer in order to switch the unicast streams of the end-user devices to the switch buffer before the single broadcast stream begins.

9. The method of claim 8 wherein the length of the switch buffer is at least as long as the shortest interval of personalized content so that the time before the single broadcast stream commences can be completely filled with either personalized content or the switch buffer.

10. The method of claim 1, wherein duration of the aggregation interval is based on at least one of the following parameters: bandwidth consumption, number of personalized contents to be unicasted, advertising revenue, and end-user experience.

11. The method of claim 1, wherein duration of the aggregation interval is optimized to minimize a peak required bandwidth per restart request based a total number of end-user devices that join the restarted broadcast stream while the restarted broadcast stream is active.

12. The method of claim 1, wherein the number of personalized content for the end-user device is zero when the remaining portion of the aggregation interval for the end-user device is less than the shortest personalized content.

13. The method of claim 1 further comprising, when the remaining portion of the aggregation interval for the end-user is shorter than the shortest personalized content, servicing the end-user device into a next aggregation interval.

14. The method of claim 1 further comprising, when the end-user device is tuned to the restarted broadcast stream, sending a request to terminate the unicast session to release bandwidth resources.

15. The method of claim 1 further comprising, if the end-user device makes a channel change to a desired broadcast stream while the unicast stream is active, terminating the unicast stream and tuning the end-user device to the desired broadcast stream.

16. The method of claim 15 further comprising, receiving a new restart request from the end-user device and adding the end-user device to a different aggregation interval.

17. The method of claim 1, wherein the switch buffer is at least as long as the shortest personalized content.

* * * * *